Oct. 11, 1938.  C. BANKS  2,132,772
PROGRESSIVE HOBBYHORSE
Original Filed Jan. 12, 1937
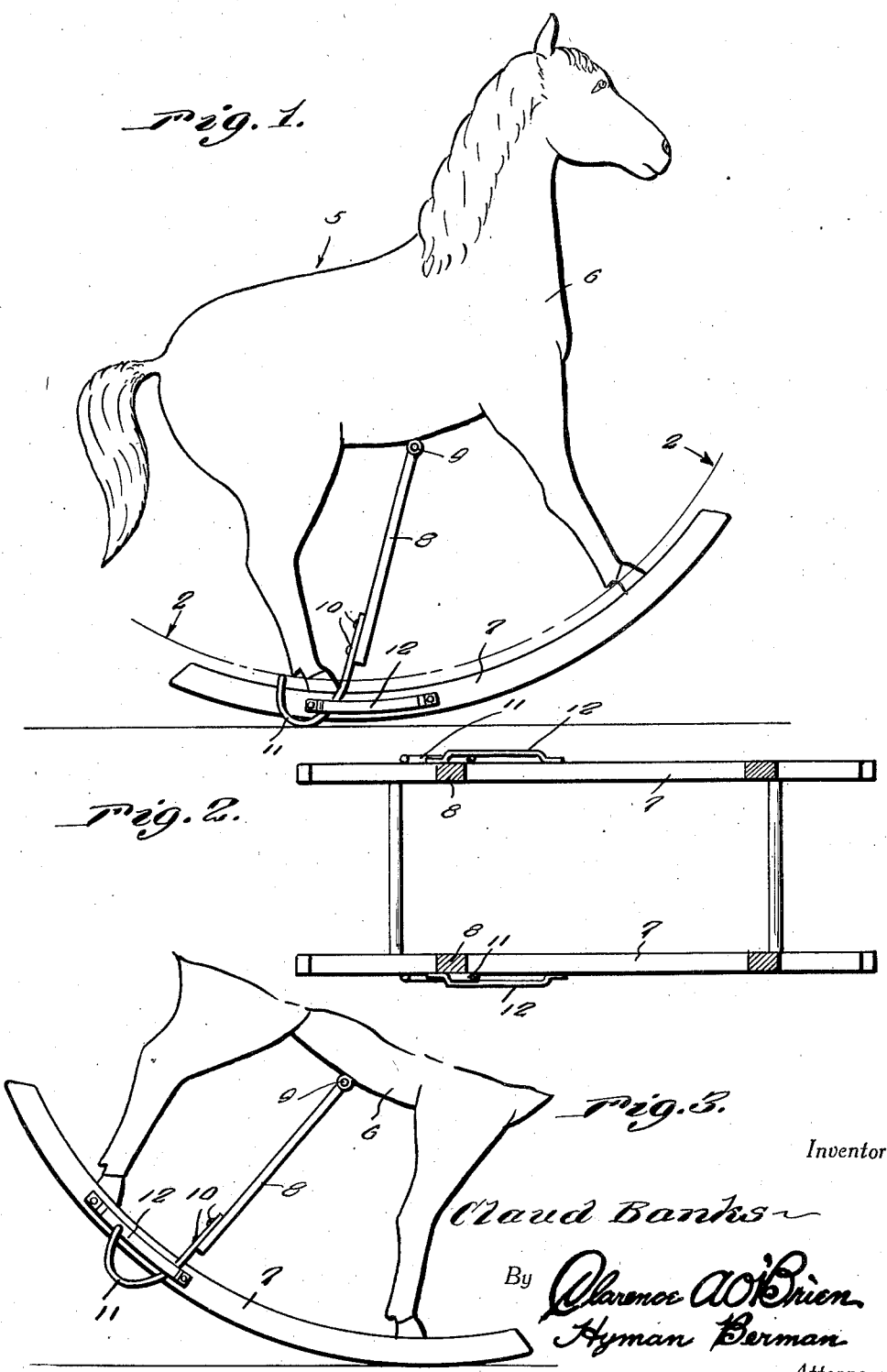

Patented Oct. 11, 1938

2,132,772

UNITED STATES PATENT OFFICE 2,132,772

PROGRESSIVE HOBBYHORSE

Claud Banks, Canton, Ohio

Application January 12, 1937, Serial No. 120,311
Renewed July 14, 1938

2 Claims. (Cl. 272—53)

This invention relates broadly to toys, and more particularly to figure toys.

An object of the present invention is to provide an improved hobby horse.

The invention, broadly, resides in the provision of a hobby horse having means associated therewith whereby the horse will be caused to progress or advance incidental to the rocking movement thereof.

The invention, together with its objects and advantages, will be best understood from the following description taken in connection with the accompanying drawing, wherein:

Figure 1 is a side elevational view illustrating a hobby horse embodying the features of the present invention.

Figure 2 is a horizontal sectional view taken substantially on line 2—2 of Figure 1; and Figure 3 is a fragmentary detail side elevational view further illustrating the invention.

Referring to the drawing by reference numerals, it will be seen that 5 indicates generally a more or less conventional hobby horse which includes among other parts 6 the figure of a horse and the rockers 7.

In accordance with the present invention, there are provided means for causing the horse to progress or advance incidental to the rocking thereof. In the preferred embodiment thereof this means consists of a pair of rigid bar members 8 formed of wood or other suitable material hinged at one end to the under side of the belly of the horse as at 9.

To the free ends of the members 8 are secured as at 10 one end of the metallic straps 11, each strap 11 being preferably formed of spring metal and adjacent one end is bent into a substantial U to provide what may be termed a tread portion that has bearing engagement with the ground, as clearly suggested in Figure 2.

The tread ends of the straps 10 work in suitable guides 12 secured to the rockers 7 adjacent the rear ends of the rockers as clearly shown.

It will thus be seen that with my attachment consisting of the members 8, 11, and 12, applied to the rocking horse in the manner illustrated and described, the horse will be caused to progress or advance incidental to the rocking movement thereof.

It is thought that a clear understanding of the construction, utility, and advantages of the invention will be had without a more detailed description.

Having thus described the invention, what is claimed as new is:

1. In a rocking horse, a pair of rockers, a horse simulating figure mounted on said rockers, a pair of members hinged at one end to the belly of the horse at opposite sides of the latter and substantially midway between the front and rear ends of the horse, guide members mounted on the rockers rearwardly of the vertical center line of the horse, and tread members secured at one end to said hinged members and working in said guides for causing progressive movement of the horse incidental to the rocking thereof said tread members comprising a shank portion inserted through the guide and having a hook-shaped ground engaging lower end, said guide restraining the tread members within a predetermined range of movement.

2. In combination, a rocking horse including rockers and a horse simulating figure mounted on said rockers, ground engaging means connected with the horse simulating figure, and cooperable therewith for causing progressive movement of the horse incidental to the rocking movement thereof, said ground-engaging means comprising a pair of shank members having hook-shaped lower ends and means carried by the rockers adjacent their rear ends and engaging the ground-engaging portion of said ground-engaging means to limit progressive actuating movement thereof and to maintain said ground-engaging means in a rearwardly inclined direction.

CLAUD BANKS.